Nov. 2, 1965    C. N. BERNSTEIN ETAL    3,214,863
FISHING GAME AND GAME PIECE THEREFOR
Filed Jan. 11, 1961
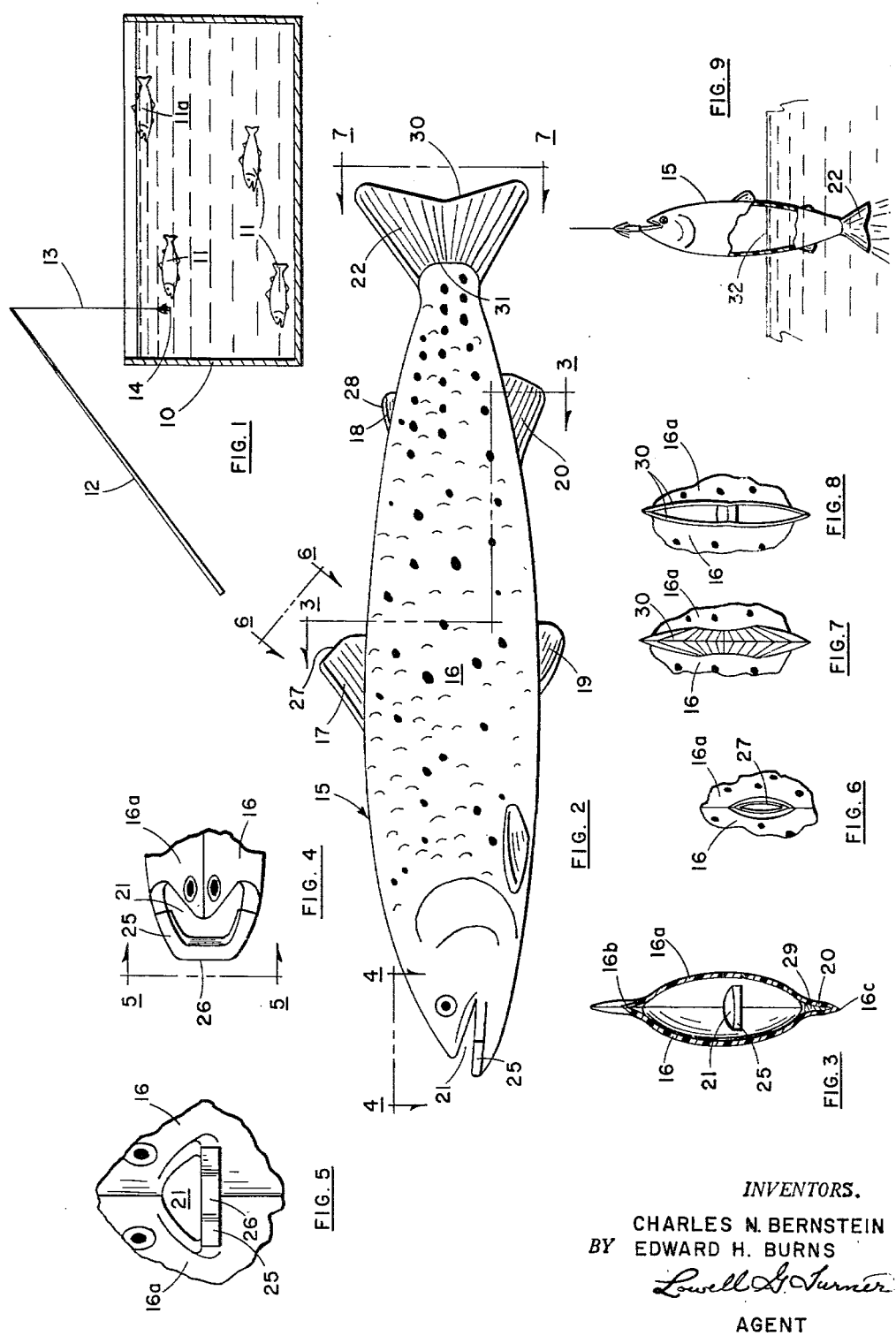
INVENTORS.
CHARLES N. BERNSTEIN
EDWARD H. BURNS
BY Lowell G. Turner
AGENT

United States Patent Office 3,214,863
Patented Nov. 2, 1965

3,214,863
FISHING GAME AND GAME PIECE THEREFOR
Charles N. Bernstein, 22330 Tiaro, Woodland Hills, Calif., and Edward H. Burns, 6300 Calvin Ave., Reseda, Calif.
Filed Jan. 11, 1961, Ser. No. 82,131
10 Claims. (Cl. 46—242)

This invention relates to new and useful improvements in fishing games and more specifically to game pieces having structural features whereby a game or fishing may be more effectively and realistically performed than in heretofore available games.

Similar to fishing games available for many years, the present game utilizes a fishing pole, a line with a permanent magnet simulating a lure, and a simulated fish, the fish including means capable of being magnetized by the magnetic lure.

Simulated fish of prior art games have been generally unrealistic in their behavior while in water. They have also been difficult to remove from the water when "hooked" by the simulated lure.

It is an object of the present invention to provide a simulated fish lifelike in appearance and action while in water.

Another object is to provide a simulated fish capable of remaining submerged at variable depths in a natural and realistic attitude.

Still another object is to provide a simulated fish having a minimum weight when withdrawn from the water.

Yet another object is to provide means whereby air may be bled from a hollow simulated fish as water fills its interior.

A further object is to provide means whereby substantially all water within the simulated fish is drained therefrom as the fish is lifted from the water.

Other objects of invention will become apparent from the following description when considered in light of the accompanying drawing in which:

FIG. 1 is a view of a rod and line having a magnetic lure positioned to attract a simulated fish;

FIG. 2 is an elevational view of a typical simulated fish of this invention;

FIG. 3 is a section through the fish's body taken along line 3—3 of FIG. 2;

FIG. 4 is a view of the fish's mouth taken along line 4—4 of FIG. 2;

FIG. 5 is a view of the fish's body taken along line 5—5 of FIG. 4;

FIG. 6 is a fragmentary view of the top edge of the forward dorsal fin as taken along line 6—6 of FIG. 2;

FIG. 7 is a fragmentary view of the tail taken along line 7—7 of FIG. 2;

FIG. 8 is a fragmentary view of the tail as taken along line 7—7, the tail being in the open position; and FIG. 9 is a view of a "hooked" fish partially removed from the water.

Illustrative of the manner in which the game is played, FIG. 1 includes a tank 10 in which at least one and preferably a plurality of simulated fish 11 are placed. The tank is representative only of the type of water body in which the fish are to be located. It has been found desirable and realistic to utilize a swimming or wading pool for this purpose, the simulated fish "swimming" about the pool at various levels of submersion as driven by the current caused by the filter or other water movement means. The lifelike movements increase the skill and the enjoyment in "hooking" the fish. Pole 12 and line 13, from which a permanent magnet 14 simulating a lure is suspended, are representative of the equipment acceptable for the game. The lure is moved about in the water in proximity to the fish's mouth until, by magnetic attraction, the fish attaches itself to the magnet in order that it may be withdrawn from the water.

A specific embodiment of a simulated fish 15 of this invention is illustrated in FIG. 2, the species trout being therein represented. It is to be understood, however, that the particular species of fish chosen is no part of the invention. Indeed, the game pieces usable need not be limited to fish, even though the game pieces are generally so referred to herein. Any living fauna which inhabit water may be simulated. The invention resides in the manner in which the simulated game pieces are constructed for ease of being caught, lifelike appearance and action, attitude assumed in the water, ability to remain submerged between the surface and the bottom of a body of water, and in structure to facilitate easy removal from the water.

The portions of simulated fish 15 having particular inventive significance are the body 16, the structure of mouth 21, the upper regions, or dorsal fins 17 and 18, the lower extremities or fins 19 and 20, and the tail 22. Submersion and attitude control are also of great significance.

Body halves 16 and 16a, as more specifically illustrated in FIG. 3, are preferably constructed from a relatively thin and flexible molded plastic material, e.g., polyethylene and may be formed separately and joined at their peripheries, at the locations indicated as 16b and 16c, in a conventional manner as, for example, by a commercially available and appropriate cement, or a heat seal, or they may be fabricated integrally. However, in either event, the body is to be hollow in order that when the fish is placed in water, the water may enter through mouth 21 until the body cavity is completely filled, the purpose for this being more fully explained below. The material is kept as thin as possible, consistent with strength, rigidity and durability, its weight being calculated and designed for proper flotation effect.

The external surface of the fish is painted or otherwise appropriately colored to provide the game piece with as natural an appearance as possible. Alternatively, pigment or other material may be added to the raw material of the body to provide the desired coloration.

FIGS. 4 and 5 more particularly illustrate the mouth construction. The extent of the opening may be varied according to desire and consistent with realism of appearance, the only requirement being that sufficient opening be allowed to facilitate easy and rapid entrance of water therethrough as the fish enters the water.

Interiorly of or surrounding the region of the mouth is affixed a magnetizable metal plug or strip 25, the main requirement here being that it is present in sufficient amount and in proper position to provide adequate magnetic contact for lure attachment and for lifting the fish from the water. In any event, it is preferable that a flat contact surface at the forward extremity of the fish be provided to present such a readily accessible and effective region for magnetic contact. It is also desirable that the metal utilized for this purpose blend well with the material from which the fish is constructed. Folded metal strip 25, crimped or otherwise attached to the lower lip of the fish, has been found particularly adaptable for this purpose. Strip 25 is provided with a flat forward surface 26 for the above-mentioned contact surface. The lip to which the metal is attached should protrude beyond the rest of the fish. This eliminates the possibility of structural interference with the lure.

At the lower extremity of the fish, extra weight is added to assist in facilitating proper buoyancy and attitude control. For general convenience of manufacture and effectiveness of function, it is best that lower fins 19 and 20 be used for this purpose. These fins may be formed integrally with the body sides and include a material more dense than the rest of the body, or they may be made hollow, allowing space for the addition of a metal weight of the proper proportions. Alternatively, the weights may be attached to the body as separate structural units. The amount of weight required must be determined according to the particular design of the individual species and size of fish, adjustments being made as necessary to produce the proper flotation effect. FIG. 3 illustrates the location of a metal weight 29 in a typical application within lower fin 20. Fin 19 may also receive weight when the addition of extra weight or a different longitudinal distribution is required.

In achieving the best flotation and balance, the composite specific gravity of the several parts comprising the fish is to be equal to one (1) or as reasonably close thereto as possible within limits of manufacturing capabilities. A practical approach for accomplishing this condition is to utilize a material, e.g., plastic, with a specific gravity of slightly less than 1 in the body construction. The metal mouthpiece is then added. Finally, the metal weights are installed in the proper locations. Only sufficient weight is added in this final step to bring the specific gravity of the total assembly to as nearly 1 as possible. So long as the lower fins and weights are aligned with the vertical center line of the fish an upright position of the fish while it is submerged will be maintained. If separately detachable and weighted fins are utilized, they may be moved forward or rearward as necessary to establish proper fore and aft balance in maintaining the longitudinal axis of the fish in essentially a parallel attitude with respect to the surface of the water. When the fins are integrated with the material of the body sides, the proper fore and aft locations for this purpose must be established during the design phases.

In accordance with known hydrostatic laws, when the proper specific gravity and attitude balance have been achieved, the fish will stay submerged at whatever depth it is placed, subject only to external forces such as current, initial momentum, or impact. In the usual instance, since these variables are continuously changing the fish will travel realistically up and down and in all random directions, or it may lurk in a submerged position when such external forces are absent.

In the uppermost region of the simulated fish's body is provided at least one perforation, or air bleed, whereby air is permitted to escape from the body interior. Consistent with the maintenance of realism in appearance and the disguise of functional features, the air bleeds are preferably incorporated in the upper edge of one or more of upper fins 17 and 18, when such are present, or at the highest point of any existing air entrapment regions. Therefore, the fin material in this area should be relatively thin and flexible for ease of deformation in allowing air to escape therethrough, but resilient for the resumption of a closed appearance when the air has been expelled. The fin sides are tapered from their point of attachment to the body to their upper extremity. This prevents excessive tendencies for them to be forced against one another, thereby preventing the free escape of air during initial submersion. The positions indicated in FIG. 2 as 27 and 28 are preferred for such air bleeds. Slot 27 is illustrated in the open or flexed attitude in FIG. 6.

Upon complete submersion no entrapped air remains in the body cavity. This may be assured by gently squeezing the fish to assure that all air is expelled. In the event it is desired that the fish remain partially exposed above the water surface, a portion of the air is not forced from the body interior. This gives an extra buoyancy due to the float effect of the retained air. Such fish position is illustrated at 11a of FIG. 1.

Tail 22 of the fish is so constructed as to facilitate easy and prompt drainage of water from the interior of body 16 as the fish is lifted from the water. Thus, only the weight of the fish proper is required to be lifted, not that of the water normally filling its interior. The magnetic force required to remove the fish from the water is thereby materially reduced over that required for the removal of simulated fish of the prior art. This results in the ability to use smaller and cheaper magnets as lures than would otherwise be required.

The drainage is accomplished by providing a slit 30 along the rearward edge of tail 22 (FIGS. 2, 7 and 8). The tail has a naturally tapered shape from its forward portion 31 (FIG. 2) to rearward edge 30, lending resiliency to the otherwise thin and flexible tail material and providing for easy distention. Thus, the water may drain rapidly through the tail as the fish is lifted; and its normal shape will be immediately recovered when the water has so drained. FIG. 8 illustrates the tail slit substantially as it typically appears while distended.

FIG. 9 shows fish 15 partially cutaway to illustrate that the water leaves the fish's tail substantially as fast as the fish is removed from the water. Hence, the water level 32 interiorly of the fish's body is approximately level with that of the water surface from which the fish is being withdrawn. The beneficial result is that noted above, i.e., no water is caused to be lifted.

In a fishing game sequence utilizing a single simulated fish, the fish is first placed in the water. Water enters through mouth 21 into the interior of body 16 which is, at this time, filled with air. As the water enters, the pressure exerted on fins 17 and 18 causes their edges to flex outward, opening air bleed slots 27 and 28. As the air escapes (with assistance as necessary by squeezing) water continues to rapidly enter the body cavity until it is completely filled. A portion of the air may also escape through the slit in rearward tail edge 30. The ability to rapidly and completely evacuate the air from the fish's body is of material assistance in allowing the fish to immediately assume its proper attitude and to prevent it from riding too high in the water.

Once the position of the fish has been established, the pole, with its line and lure attached, is taken in any manner common to practices in actual fishing, and the lure is cast into the vicinity of the fish. The lure is then moved about as necessary to bring it into the immediate vicinity of the fish's mouth and until it is in sufficiently close proximity to metal strip 25 that the strip is magnetically attracted to the lure. The magnetic attraction lends a lifelike appearance to the fish as it seeks the lure and eventually becomes "hooked." The "hook-up" is complete when metal strip 25 has become magnetically attached to the lure.

As the fish is "played" interest and variety are added to the game resultant from the ability of the fish to escape if jerked too quickly or if an attempt is made to remove it from the water too rapidly. Thus, a certain skill in maneuvering the fish enters into the game. When the fish is pulled slowly from the water, that water present internally of the body is enabled to drain through the flexed tail without overstraining the magnet and losing the fish. The fish may then be netted in a conventional manner or landed without benefit of a net.

Time limits may be established for the catching of one or more fish, or group competition may be set up. The presence in the water of a variety of species of fish "swimming" at random depths lends an element of interest and realism to the game and will provide extra enjoyment in scoring, particularly when the game is played competitively. Scoring may also be varied according to the number of fish caught and their sizes.

This fishing game, particularly as played with the novel and lifelike game pieces described herein, has universal appeal for young and old alike. It satisfies the desire of people everywhere to go fishing, especially for those who seldom have the opportunity to fish in actuality.

The fish of this game may be re-used an indefinite number of times by simply tossing them back into the water after once having been caught. Their construction gives them a relatively indestructible quality.

The magnetic lure of this invention may be an ordinary bar or horseshoe magnet or it may be provided in any desirable shape consistent with magnetic principles. It is preferable, however, that it be disguised in the appearance of common bait, a fly or a lure. It should be of sufficient magnetic strength to become firmly attached to the metal upon the fish's mouth and to lift the fish from the water, but not so strong as to remove an element of skill from the game in "hooking" the fish. More than one magnetic lure of various magnetic strengths may be provided with the game equipment in order that varying degrees of skill in "playing" the fish may be provided.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A game piece adapted for floating fully submerged in water and for removal therefrom by magnetic means comprising a body simulating a living water creature, said body being hollow and including water inlet means at a forward extremity thereof to enable water to fill said body when said body is submerged, water outlet means at a rearward extremity thereof, air outlet means separated from said water inlet and outlet means intermediate the extremities of said body in an upper portion thereof, and means on a forward extremity of said body capable of being magnetically attracted, said simulated creature having a specific gravity of substantially one, said water outlet means being flexible under the weight of the contained water to open and rapidly drain the water when said game piece is lifted from the water by separate magnetic means attached to said magnetically attractable means.

2. A game piece adapted for at least substantial submersion in water and for removal therefrom by magnetic means comprising a body simulating a living water creature and adapted to contain water exceeding said body weight, said body being of hollow single cavity construction and including water inlet means at a forward extremity thereof, water outlet means at a rearward extremity thereof, air outlet means in an upper extremity while said game piece is naturally oriented and intermediate of said water inlet and outlet means, and means on a forward extremity of said body adjacent said water inlet means capable of being magnetically attracted, said simulated creature having a specific gravity of substantially one, said water outlet means being flexible under the weight of contained water to open under the weight of water contained within said game piece when said game piece is suspended from a line during its withdrawal from the water so as to rapidly drain the water.

3. A game piece adapted to be submerged in water and removed therefrom by a magnetic lure on a fishing line comprising a simulated water fauna having a hollow body of such size as to be capable of containing water substantially exceeding the weight of said body, water inlet means in a forward extremity of said body, air outlet means in said body intermediate its extremities, and means adjacent said water inlet means capable of being magnetically attracted, water outlet means in the opposite extremity of said body flexible for automatic opening and rapid draining of the water when subjected to the weight of water contained within said game piece as said game piece is lifted from the water.

4. The game piece of claim 3 wherein the material of said body is flexible, said air outlet means is flexible, and a weight in a lower extremity of the game piece is provided for specific gravity and attitude control purposes.

5. The game piece of claim 3 wherein said outlet means for air and water are normally closed and disguised as natural portions of said body.

6. A simulated fish for a fishing game comprising a hollow body having forward, rearward, upper and lower extremities in substantial conformity to a natural fish, water inlet means and a magnetizable metal in the forward extremity of said body, means defining air bleeds from said body in the upper extremity of said body, means in the lower extremity of said body for imparting to said simulated fish a specific gravity of substantially unity and for achieving ultimate attitude balancing of said body, water outlet means in the rearward extremity of said body flexible for opening and rapidly draining the water under the weight of water contained within said body when said body is suspended from a line during withdrawal from the water.

7. A simulated fish for a fishing game comprising a hollow body including portions simulating a mouth, a tail, and upper and lower fins intermediate said mouth and said tail, said mouth being open to provide a water inlet means to said body, means capable of being magnetized attached to said mouth, means in said tail flexible to provide a water outlet from said body under the weight of the contained water as the simulated fish is withdrawn from the water, and means in said upper fins flexible to provide an air outlet leading from said body, the discharge capacity of said water outlet being sufficient to provide a weight significantly less than the total weight of the fish and all the water contained therein prior to initiation of withdrawal.

8. A simulated fish for a fishing game comprising a hollow body constructed from a flexible material and having an external surface colored in the appearance of the species represented, a mouth upon the forward extremity of said body open to provide water inlet means to said body, a magnetizable metal attached over a lip portion of said mouth and adapted to be attached by a magnet, at least one upper fin on said body, said fin constructed from a flexible material and having a normally closed opening along an upper edge thereof capable of opening to allow air egress therefrom, a tail at a rearward extremity of said body, said tail constructed from a flexible material and having a normally closed opening along a rearward edge thereof capable of opening to allow water egress therefrom under the weight of the contained water as said simulated fish is withdrawn from the water, and at least one hollow lower fin on said body, said lower fin having weight located therein to assist in providing buoyancy and attitude control for said simulated fish, the discharge capacity of said water outlet being sufficient to provide a weight significantly less than the total weight of the fish and all the water contained therein prior to initiation of withdrawal.

9. The simulated fish of claim 8 wherein said body is constructed of a plastic material sufficiently thin to provide flexibility and wherein sides of said body are separately constructed and joined at their common peripheries except at said fin and tail extremities.

10. A simulated fish for a fishing game comprising a hollow body including portions simulating a mouth, a tail, and upper fins and lower fins intermediate said mouth and said tail, said mouth being open to provide a water inlet means to said body, means capable of being magnetized attached to said mouth, means in said tail flexible to provide a water outlet from said body under the weight of the contained water, and means in said upper fins flexible to provide an air outlet leading from said body, at least one of said lower fins being hollow and a weight being located therein for buoyancy control and to assist in maintaining a natural attitude of said simulated fish when in water, said body being constructed of a plastic material sufficiently thin to provide flexibility and being integrally constructed as a unitary part, the discharge capacity of said water outlet being sufficient to provide a weight significantly less than the total weight of the fish and all the water contained therein prior to initiation of withdrawal.

References Cited by the Examiner

UNITED STATES PATENTS

| | | | |
|---|---|---|---|
| 934,179 | 9/09 | Jackson | 273—140 |
| 2,277,672 | 3/42 | Stone | 46—237 |
| 2,408,141 | 9/46 | Heil | 273—140 XR |
| 2,703,469 | 3/55 | Raizen | 273—140 XR |
| 2,932,916 | 4/60 | Strickland | 46—92 |

RICHARD C. PINKHAM, *Primary Examiner.*

LEONARD W. VARNER, Jr., DELBERT B. LOWE, *Examiners.*